Aug. 26, 1952     D. G. RANDALL     2,608,387
FRACTIONAL DISTILLATION APPARATUS
Filed Aug. 15, 1949
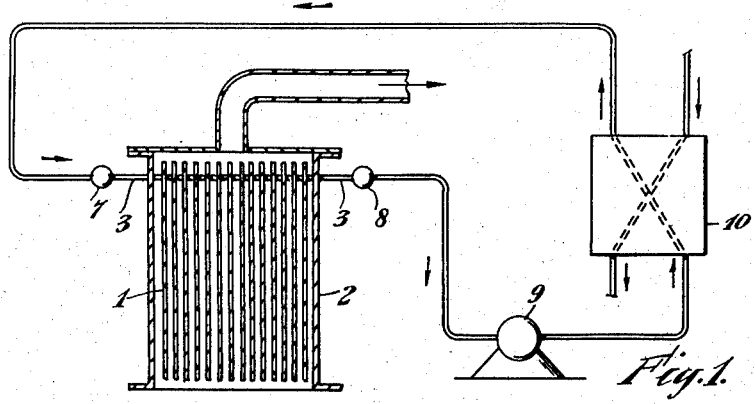
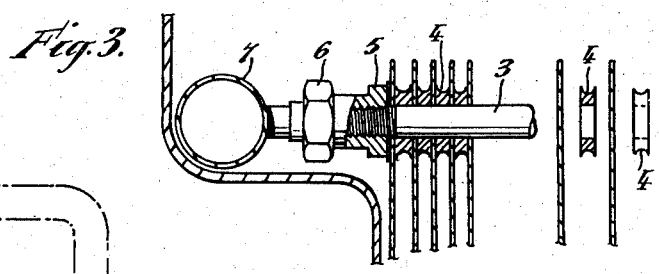
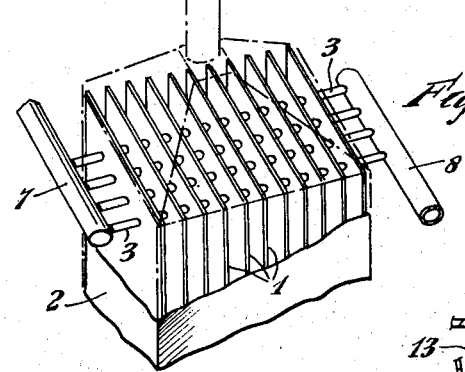
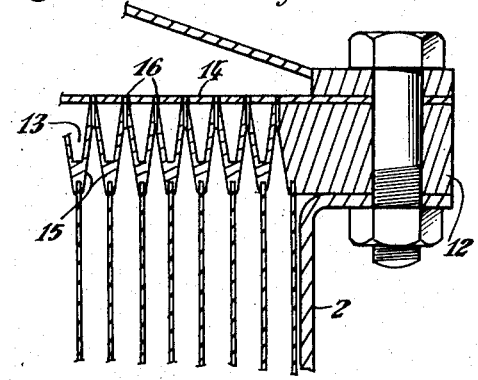
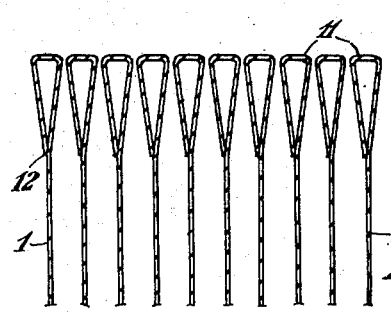
David Geoffrey Randall
Inventor
By Stowell & Evans
Attorneys Patented Aug. 26, 1952

2,608,387

UNITED STATES PATENT OFFICE 2,608,387

FRACTIONAL DISTILLATION APPARATUS

David Geoffrey Randall, Kenley, England

Application August 15, 1949, Serial No. 110,438
In Great Britain February 19, 1947

3 Claims. (Cl. 257—44)

This invention relates to apparatus for fractional distillation in which use is made of a "wetted-wall" column. Wetted-wall columns have hitherto been utilised mainly for experimental work and have generally employed a tube or tubes for the fractionating surfaces. Although in such columns the fractionating efficiency depends upon a number of factors, it may broadly be stated that the fractionating efficiency is an inverse function of the diameter of the tube. The very small tubes which are required to obtain high-fractionating efficiencies cannot easily be installed in a plant of commercial dimensions. This arrangement is also uneconomic in view of the small percentage of the total cross sectional area, of a column structure employing a large number of small tubes, which may be effectively utilised in practice. Another difficulty is the control of the distribution of the reflux on to the operative surfaces of the column.

The object of this invention is to provide an improved apparatus for fractional distillation and a simple form of fractionating equipment of the wetted-wall type, for commercial distillation plant.

In accordance with the invention there is provided apparatus for fractional distillation comprising a casing, a plurality of vertical plates mounted in said casing in parallel relationship and in close proximity relative to the cross-sectional dimensions of the casing, and cooling means comprising hollow ducts for carrying cooling fluid in heat-conductive relation to the upper ends of the plates to effect selective condensation of any desired proportion of vapor rising between the plates, whereby condensate formed in the cooled region will flow down both sides of the plates to form a wetted wall column.

The cooling of the vapour is effected by fluid which is caused to flow in a circuit which passes through or over the upper ends of the plates.

Preferably the fluid is circulated at high velocity through a closed circuit, part of which is in heat-conductive relation to the uppermost ends of the said plates, whereby a substantially constant temperature in the cooling fluid is maintained in the vicinity of the plate structure.

Referring now to the accompanying drawing in which embodiments of the invention are shown by way of example:

Fig. 1 is a diagrammatic arrangement of apparatus according to one embodiment of the invention;

Fig. 2 is a perspective view of one form of condensing head of the plate structure;

Fig. 3 is a part sectional detail elevation showing the plate assembly;

Fig. 4 is a part sectional view of a modified form of plate assembly; and

Fig. 5 is a part sectional detail elevation of a further modified cooling duct construction.

In the embodiment of the invention shown in Figures 1, 2 and 3 a series of flat plates 1 of a predetermined area are located in parallel arrangement, and closely spaced relative to the cross-sectional dimensions of the column. The said plates are mounted in a casing 2, which closes the sides of the plates thus forming a series of what may be termed vapour flues, which are rectangular in cross section. The spacing of the plates may be achieved in any convenient manner. The upper ends of the plates are spaced apart by attaching the plates at set intervals on tubular ducts 3 which pass transversely through the said plates. The said ducts are arranged to lie parallel in a horizontal plane and are located by spacing collars 4. The arrangement is preferably such that the plate assembly can be dismantled at will for cleaning purposes, and for this purpose the plates and collars are retained on the ducts by the nuts 5. Where the area of the plate demands it, additional spacing means may be provided by forming ribs, dimples or other projections on the plates which will serve to keep the plates apart and to prevent them from buckling.

The inlet and outlet ends of the transverse ducts are connected by unions 6 to header tubes, 7, 8 of a closed circulating system incorporating a pump 9. In this example the said system also includes a heat exchanger 10 adapted to lower the temperature of the cooling fluid in use to the required cooling temperature. Coolant from an external source is passed through the other side of the heat exchanger in order to maintain the temperature of the cooling fluid at the required level. Preferably, the pump is adapted to circulate the cooling medium at a relatively high velocity so that the cooling fluid flowing through the transverse ducts has a more or less constant temperature. Thus latent heat transmission will be more or less equal on the surface of all the plates forming the wetted-wall column.

A wetted-wall column constructed as above can be associated with any desired form of distillation plant, and allows the vapours to rise between a plate structure whose operating surfaces, being in relatively close proximity, provide a very high fractionating efficiency. Moreover, the effective utilization of the total cross sectional area of the column is limited only by the thickness of the plates employed, since both faces of the plates form operating surfaces. Furthermore, a uniform distribution of reflux is induced on the operating surfaces by the cooling medium in the horizontal cooling ducts which causes condensation of the requisite amount of vapour, substantially before the vapour reaches the ducts. The latent heat is conducted through the upper end of each plate, through the walls of the ducts and hence to the cooling medium. If the said medium is circulated at a relatively high velocity as aforesaid the effect of the temperature gradient in the medium as it passes through the ducts is substantially overcome, and a very high film co-efficient of heat transfer is obtained.

This very high film co-efficient is, in fact, essential to the solution of the difficult heat-transfer problem which this invention aims to solve: although there is no visible distinction between the condensing and fractionating surfaces, the former may, nevertheless, be regarded as the extended surface of a heat-exchanger similar to the gilled tube type which is most commonly used for air heating.

It will be appreciated that the plates need not be flat but may be corrugated or otherwise shaped: they may also be perforated or made of wire mesh or expanded metal. Moreover, although substantially rectangular plates are the most convenient, the invention is not limited to this shape. The whole fractionating equipment combines high efficiency with simple construction and gives ease of maintenance and servicing. It is also easily dismantled for cleaning purposes which is of considerable importance in apparatus of this type.

The arrangement of the ducts may be modified in a variety of ways and they may run along the upper edges of the plates. The ducts may be of any desired cross-sectional shape. They may be formed integrally or detachably on the upper parts of the plates. Where the ducts have sufficient condensing surface, they need not be integral parts of the plates but can be mounted in close heat-conductive association therewith, so that any part of the reflux which condenses on the ducts surfaces will flow evenly over the plates. In Fig. 4 a construction is shown with longitudinal ducts 11 formed along the upper edges of the plates by bending the plates over into triangular cross-sectional shape and welding along the joint 12. Such ducts may be formed separately and welded on to the plates or mounted immediately above them.

In a modification, the plates are attached to, or associated with, a cooling tank, or equivalent means which in effect forms a header tank. Cooling medium is induced to flow through said tank and distillation vapour can be led up through the tank and/or laterally as desired.

A single tank common to all the plates may be used or it may be divided up into compartments or ducts. In Fig. 5 a header plate 12 is machined on both faces to form ducts 13 on the upper side, which are closed by a cover plate 14, and inclined condensing faces 15 on the underside. The latter is grooved to receive the upper edges of the plates and vapour passages 16 are formed through the plates 12 and 14. The plates may or may not be secured to the header plate. It will be understood the plate could be fabricated or formed of corrugated plate instead of being machined from the solid.

The plate assembly may be modified in a variety of ways within the scope of the invention. For example, the plates may be curved, and even tubular (of any desired section) lying one within another.

I claim:

1. Apparatus for fractional distillation comprising a casing, a plurality of vertical plates mounted in said casing in parallel closely spaced relationship, and cooling means comprising hollow coolant ducts in heat-conductive contact with the upper ends only of said plates to effect selective condensation of any desired portion of vapor rising between said plates whereby condensate formed in the cooled region will flow down both sides of the plates to form a wetted wall column.

2. Apparatus as defined in claim 1 wherein the cooling means comprises a plurality of coolant ducts positioned in a horizontal plane and extending parallel to and in heat conductive contact with the upper ends only of said plates.

3. Apparatus as defined in claim 1 wherein the cooling means comprises a plurality of coolant ducts positioned in a horizontal plane and extending transverse to and in heat conductive contact with the upper ends only of said plates.

DAVID GEOFFREY RANDALL.

REFERENCES CITED

The following references are of record in the file of this patent:

UNITED STATES PATENTS

| Number | Name | Date |
| --- | --- | --- |
| 510,734 | Trageser | Dec. 12, 1893 |
| 1,004,468 | Reynolds et al. | Sept. 26, 1911 |
| 1,457,877 | Doty | June 5, 1923 |
| 2,136,222 | Starr | Nov. 8, 1938 |
| 2,376,341 | Burk et al. | May 22, 1945 |
| 2,410,045 | Burk et al. | Oct. 29, 1946 |
| 2,448,453 | Morrison | Aug. 31, 1948 |